(12) United States Patent
Peng et al.

(10) Patent No.: US 7,598,385 B2
(45) Date of Patent: Oct. 6, 2009

(54) ASYMMETRIC CYANINE FLUORESCENT DYES

(75) Inventors: Xiaojun Peng, Dalian (CN); Tong Wu, Dalian (CN); Jiangli Fan, Dalian (CN); Shiguo Sun, Dalian (CN); Bingshuai Wang, Dalian (CN); Bing Xu, Shenzhen (CN); Jianhui Shao, Shenzhen (CN)

(73) Assignee: Shenzhen Mindray Biomedical Electronics Co., Ltd., Shenzhen (CN)

( * ) Notice: Subject to any disclaimer, the term of this patent is extended or adjusted under 35 U.S.C. 154(b) by 160 days.

(21) Appl. No.: 11/967,991

(22) Filed: Dec. 31, 2007

(65) Prior Publication Data

US 2009/0017441 A1    Jan. 15, 2009

(30) Foreign Application Priority Data

Jul. 12, 2007    (CN) ..................... 2007 1 0137258

(51) Int. Cl.
*C07D 215/12*    (2006.01)
(52) U.S. Cl. .................. 546/165; 546/166; 548/121; 436/89; 436/90; 436/92; 436/96; 436/800
(58) Field of Classification Search ................ 546/165, 546/166; 548/121; 436/89, 90, 92, 96, 800
See application file for complete search history.

(56) References Cited

U.S. PATENT DOCUMENTS

| | | | |
|---|---|---|---|
| 4,414,325 A | 11/1983 | Masuda et al. | |
| 4,957,870 A | 9/1990 | Lee et al. | |
| 5,958,776 A | 9/1999 | Sakata et al. | |
| 5,994,138 A | 11/1999 | Veriac | |
| 6,004,816 A | 12/1999 | Mizukami et al. | |
| 6,245,499 B1 | 6/2001 | Suzuki et al. | |
| 2003/0145394 A1 | 8/2003 | Wang et al. | |

FOREIGN PATENT DOCUMENTS

CN    1183559 A    6/1998
CN    1149397 C    5/2004

OTHER PUBLICATIONS

U.S. Appl. No. 12/334,274, Shao.
Jason A. Bordelon et al., "Viscometry and Atomic Force Microscopy Studies of the Interactions of a Dimeric Cyanine Dye with DNA," J. Phys. Chem. B 2002, 106, 4838-4843.
Alexandre Furstenberg et al., "Ultrafast Excited-State Dynamics of DNA Fluorescent Intercalators: New Insight Into the Fluorescence Enhancement Mechanism," J. Am. Chem. Soc. 2006, 128, 7661-7669.
Kristine M. Sovenyhazy et al., "Spectroscopic studies of the multiple binding modes of a trimethine-bridged cyanine dye with DNA," Nucleic Acids Research, vol. 31 No. 10, 2561-2569.
L. G. S. Brooker et al., "Absorption of Unsymmetrical Carbocyanines," J. Amer. Chem. Soc., 1945, 67, 1889-93.

*Primary Examiner*—Bernard Dentz
*Assistant Examiner*—David E Gallis
(74) *Attorney, Agent, or Firm*—Stoel Rives LLP; Kory D. Christensen; Matthew S. Bethards (57) ABSTRACT

The present disclosure provides the asymmetric cyanine fluorescent dyes of formula I in which X, n, $R_1$, $R_2$, $R_3$, $R_4$, $R_5$ and $Y^-$ are as defined in the specification. The present disclosure also provides conjugates of the fluorescent dyes, methods for preparation thereof, compositions comprising the fluorescent dyes, and methods for staining biological samples using the fluorescent dyes and compositions thereof.

Formula I

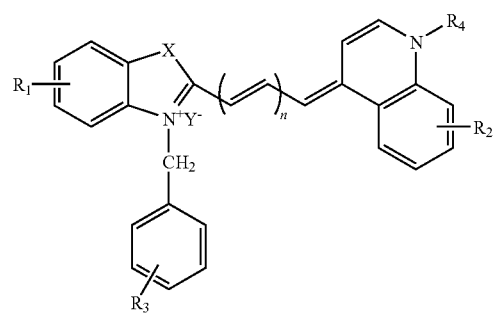

19 Claims, 5 Drawing Sheets

ASYMMETRIC CYANINE FLUORESCENT DYES

RELATED APPLICATIONS

The present application claims priority to Chinese Patent Application No. 200710137258.6, filed on Jul. 27, 2007, and entitled "Asymmetric Cyanine Fluorescent Dyes," which is fully incorporated herein by reference.

TECHNICAL FIELD

The present disclosure generally relates to dyes suitable for staining nucleic acids, and more particularly to asymmetric cyanine fluorescent dyes.

DETAILED DESCRIPTION OF PREFERRED EMBODIMENTS

The extensive application of fluorescent detection techniques in DNA hybridization assays, gene recombination assays, immunological assays, blood cell analysis and early diagnosis of tumor cells has greatly fostered the development of fluorescent dyes. The fluorescent dyes that pioneered in biodetection are acridine and phenanthridine dyes such as acridine orange and ethidium bromide, etc., whose fluorescence are greatly increased by binding to DNA small molecules through intercalation or electrostatic attraction. However, the self-fluorescence of the dyes unbound to DNA molecules may lead to a high fluorescence background that interferes with detection. Meanwhile, dyes like ethidium bromide, etc. may be replaced by other kinds of fluorescent dyes due to their high toxicity and carcinogenicity.

At present, fluorescent dyes frequently used include rhodamine, fluorescein, BODIPY and cyanine fluorescent dyes. Cyanine fluorescent dyes were first discovered by Williams 150 years ago, and are widely used as biofluorescent probes, CD or VCD recording materials, photosensitive agents for photosensitive materials, photoelectric conversion materials, etc., in which their use as fluorescent probes for biomolecules in the detection of nucleic acids and proteins has been very beneficial.

The nitrogen-containing aromatic parent nucleuses on both ends of the methine chain of cyanine dyes vary greatly in type, including thiazole, thiophene, 2-quinoline, 4-quinoline and 3H-indoline, etc. The cyanine dyes can be categorized into symmetric and asymmetric cyanine dyes depending on whether the parent nucleuses have two of the same-end groups. The asymmetric cyanine dyes are mainly used in the fluorescence labeling of physical binding. They bind to nucleic acids by way of electrostatic attraction, base-pair intercalation and groove binding, specifically depending on the structure of the dyes and the concentration ratio of the dyes to the nucleic acids.

A typical asymmetric cyanine dye is TOTO and its analogs and derivatives thereof. TOTO (thiazole orange dimer) and YOYO (oxazole orange dimer), developed by Glazer research group, are multipositively charged asymmetric cyanine fluorescent dyes having a high affinity to nucleic acids, of which different heterodimeric analogs and derivatives can be obtained by changing the dye molecules on the ends of the polymethylene chain. This type of dye shows no fluorescence in solution, but does after binding to nucleic acids, which reduces the interference from the fluorescence background during detection. Jason et. al. explored the double intercalation of TOTO and YOYO into DNA using solution viscosity measurements and atomic force microscopes [J. A. Bordelon, K. J. Feierabend, S. A. Siddiqui, L. L. Wright. J. Phys. Chem. B, 2002, 106, 4838-3843]. Fürstenberg et. al. further expounded the dynamic mechanism underlying fluorescence enhancement using ultrafast fluorescence conversion technology and time-correlated single-photon counting technology [A. Fürstenberg, M. D. Julliard, T. G. Deligeorgiec, N. I. Gadjev. J. Am. Chem. Soc., 2006, 128, 7661-7669]. However, the spectrum of this type of dyes lies in the visible light region (490-530 nm) where biological samples have a strong absorption and fluorescent emission, which greatly reduces the effectiveness of the fluorescence probe. Although the increase in the number of carbon atoms in conjugated chains may red-shift the absorption and emission wavelengths of the dyes to the near-infrared region (670-1000 nm), such as in the cases of TOTAB, TOTIN, TO-PRO-3, PO-PRO-2 and BO-PRO-2 [K. M. Sovenyhazy, J. A. Bordelon, J. T. Petty. Nucleic Acids Res, 2003, 31, 2561], the large molecular weight, complex structures and long synthetic procedure of these dyes limit their commercialization.

Moreover, on the ground that the light stability of cyanine dyes decreases as the methine chain extends, an increase of the light stability of the long wavelength cyanine dyes becomes desirable.

U.S. Pat. No. 6,004,816 describes a reagent for the classification and counting of white blood cells, wherein the specific binding of the disclosed fluorescent dyes to RNA increases the fluorescence intensity. However, such fluorescent dyes still suffer from weak light stability that contributes to experiment errors.

U.S. Patent Publication No. 2003/0145394 discloses fluorescent dyes excitable by a helium-neon laser that are used in the detection and counting of reticulocytes. Such fluorescent dyes require a costly helium-neon laser, which represents a high equipment cost for practical use.

Therefore, there remains a need to develop novel fluorescent dyes which (1) do not fluoresce when unbound to nucleic acids but have a high fluorescence quantum yield bound to nucleic acids; (2) have a certain level of water solubility together with a certain ability to penetrate cell membranes; and (3) differ significantly in spectrum scope from biological samples.

The following terms as used herein have the following meaning, unless otherwise specified.

The term "alkyl" as used herein includes straight and branched alkyl groups. Reference to a single alkyl such as "propyl" specifically means a straight alkyl group, while reference to a single branched alkyl such as "isopropyl" specifically means a branched alkyl group. For example, "$C_{1-6}$alkyl" includes $C_{1-4}$alkyl, $C_{1-3}$alkyl, methyl, ethyl, n-propyl, isopropyl and tert-butyl. The similar rules also apply to other groups as used throughout the present specification.

The term "halogen" as used herein includes fluorine, chlorine, bromine and iodine.

The term "benzyl" as used herein refers to —$CH_2$-phenyl group. Modification of a benzyl group with the phrase "optionally substituted with" means that the benzyl group either can exist in an unsubstituted form, or can be substituted with one or more suitable substituents at any suitable positions. Suitable substituents include, but are not limited to, halogen, hydroxyl, sulfhydryl, cyano, nitro, alkyl, aryl, alkoxy, heterocyclyl, haloalkyl, amino, alkylamino, amido, carboxyl, etc., so long as the compounds formed have the properties as contemplated by the present invention. Preferably, the benzyl group is optionally substituted with halogen, hydroxyl, sulfhydryl, cyano, nitro or amino.

$Y^-$ as used herein stands for the counter ion and can be any suitable anion, including, without limitation, inorganic or organic anions, e.g., halogen ions, $ClO_4^-$, $PF_6^-$, $CF_3SO_3^-$, $BF_4^-$, acetate or p-toluenesulfonate anions.

Compounds and Conjugates Thereof

In one aspect, the present disclosure integrates the advantages of existing cyanine dyes and makes improvements on the basis thereof. The present disclosure also provides a category of asymmetric cyanine fluorescent dyes having the following general structural formula I:

Formula I wherein n is 1, 2 or 3;

X is chosen from: $C(CH_3)_2$, O, S or Se;

$R_1$ and $R_2$ are each independently chosen from H, $C_{1-18}$alkyl, —$C_{1-6}$alkyl-$OR_5$ or halogen;

$R_3$ is independently chosen from: H, $C_{1-18}$alkyl, $OR_5$, —$C_{1-6}$alkyl-$OR_5$, $COOR_5$, $NO_2$, CN or halogen;

$R_4$ is $C_{1-18}$alkyl, —$C_{1-6}$alkyl-$OR_5$, benzyl or halogen, said benzyl optionally substituted with one or more substituents independently chosen from: halogen, hydroxyl, sulfhydryl, cyano, nitro, alkyl, aryl, alkoxy, heterocyclyl, haloalkyl, amino, alkylamino, amido, or carboxyl;

$R_5$ is H or $C_{1-18}$alkyl; and $Y^-$ is a counter ion;

or derivatives and conjugates thereof.

In one embodiment, n is 1 or 2, and in another embodiment, n is 1.

In one embodiment, X is $C(CH_3)_2$, O or S; in another embodiment, X is $C(CH_3)_2$ or S; and in yet another embodiment, X is S.

In one embodiment, $R_1$ and $R_2$ are each independently selected from H, $C_{1-18}$alkyl or halogen; in another embodiment, $R_1$ and $R_2$ are each independently selected from H or $C_{1-18}$alkyl; in yet another embodiment, $R_1$ and $R_2$ are each independently selected from H or $C_{1-12}$alkyl; further still, $R_1$ and $R_2$ are each independently selected from H or $C_{1-6}$alkyl; and in some embodiments, $R_1$ and $R_2$ are both H.

In one embodiment, $R_3$ is H, $C_{1-18}$alkyl, $OR_5$, $COOR_5$ or halogen; in another embodiment, $R_3$ is H, $C_{1-12}$alkyl, $OR_5$, $COOR_5$ or halogen; and in yet another embodiment, $R_3$ is H, $C_{1-6}$alkyl, $OR_5$, $COOR_5$ or halogen.

In one embodiment, $R_4$ is $C_{1-18}$alkyl, benzyl or halogen, said benzyl optionally substituted with one or more substituents chosen from: halogen, hydroxyl, sulfhydryl, cyano, nitro, alkyl, aryl, alkoxy, heterocyclyl, haloalkyl, amino, alkylamino, amido, or carboxyl. In another embodiment, $R_4$ is $C_{1-18}$alkyl or benzyl, the benzyl being optionally substituted with halogen, hydroxyl, sulfhydryl, cyano, nitro or amino. In yet another embodiment, $R_4$ is $C_{1-12}$alkyl or benzyl, the benzyl being optionally substituted with halogen, hydroxyl, sulfhydryl, cyano, nitro or amino. Further still, $R_4$ is $C_{1-12}$alkyl or benzyl, the benzyl being optionally substituted with halogen, hydroxyl, sulfhydryl, cyano, nitro or amino. In some embodiments, $R_4$ is $C_{1-6}$alkyl or benzyl, the benzyl being optionally substituted with halogen, hydroxyl, sulfhydryl, cyano, nitro or amino.

In one embodiment, $R_5$ is H or $C_{1-12}$alkyl, and in another embodiment, $R_5$ is H or $C_{1-6}$alkyl.

In one embodiment, $Y^-$ is chosen from: halogen ions, $ClO_4^-$, $PF_6^-$, $CF_3SO_3^-$, $BF_4^-$, acetate or p-toluenesulfonate anions.

In one embodiment, the present disclosure also provides compounds of the above-mentioned formula I existing in the form of conjugates.

In another aspect, the present disclosure further provides a method for synthesizing the compounds of the above-mentioned formula I or conjugates thereof.

In another aspect, the present disclosure further provides a composition comprising the compounds of the above-mentioned formula I or conjugates thereof, which is used for staining biological samples.

In another aspect, the present disclosure further provides a method for staining biological samples using the compounds of the above-mentioned formula I or conjugates thereof, or a composition comprising the compounds of the above-mentioned formula I or conjugates thereof.

The compounds of the present disclosure can be used directly for staining biological samples in the form of salts as described herein. Alternatively, in one embodiment, the compounds of the present disclosure can exist in the form of derivatives of the compounds of formula I, said derivatives including, but not limited to, conjugates.

Typically, the conjugates are used in the fluorescence activated cell sorter (FACS). "Conjugate" as used herein refers to compounds formed by attaching the fluorescent dyes disclosed to other molecules through covalent bonds. Molecules that can be conjugated to the fluorescent dyes disclosed may be those that can bind specifically to cells or cell components, including, but not limited to, antibodies, antigens, receptors, ligands, enzymes, substrates, coenzymes, etc. Generally, the test sample is incubated with the fluorescent conjugates for a period of time so that the fluorescent conjugates bind specifically to certain cells or cell components in the test sample. The binding of the fluorescent conjugates to the cells or cell components can also be referred to as staining. The above staining step can be repeated in sequence several times, or a variety of conjugates can be used for concurrent multistaining. After staining, analysis of the sample is conducted in the fluorescence activated cell sorter, wherein the excitation light source excites the fluorescent dyes disclosed in the conjugates and the detection apparatus detects the emitted light generated by the excited fluorescent dyes.

Alternatively, in another embodiment, the fluorescent conjugates can also be used in solid phase immunological assays, e.g., in sandwich immunological assays. The techniques of solid phase immunological assays are well known in the art and can be found in standard textbooks.

Synthesis of the Compounds

The present disclosure further provides a method for synthesizing compounds of the above-mentioned formula I.

The asymmetric cyanine fluorescent dyes generally are synthesized by the following steps. First, react unsubstituted or substituted 2-methylbenzothiazole, 2-methylbenzooxazole or 2,3,3-trimethyl-3H-indoline, etc. as the starting material with substituted or unsubstituted benzylhalide in a molar ratio of 1:1-2 by refluxing in toluene for 12-36 hours to obtain quaternary ammonium salt intermediates of formula II:

Formula II wherein X, $R_1$, $R_3$ and $Y^-$ are as defined in the compounds of formula I (above).

Next, condense the resulting quaternary ammonium salt intermediates of formula II with linking molecules to obtain compounds of formula III:

Formula III wherein X, n, $R_1$, $R_3$ and $Y^-$ are as defined in the compounds of formula I, and the linking molecules can be N,N'-diphenylformamidine or higher homologues thereof.

Then, obtain substituted or unsubstituted 4-methylquinoline quaternary ammonium salt intermediates in a process similar to that used in the synthesis of compounds of formula II. Finally, reflux the 4-methylquinoline quaternary ammonium salt intermediates with compounds of formula III in pyridine or acetate anhydride to afford the asymmetric cyanine fluorescent dyes of the present disclosure. The resulting fluorescent dyes can be recovered using the separation and purification techniques well known in the art to achieve the desired purity.

All the raw materials used in the present disclosure are commercially available, or can be readily prepared from raw materials known in the art by using methods known to those skilled in the art or those disclosed in the prior art.

It will be appreciated that certain of the various ring substituents in the compounds disclosed may be introduced by standard aromatic substitution reactions or generated by conventional functional group modifications either prior to or immediately following the processes mentioned above, and as such are included in the process aspect of the present disclosure. Such reactions and modifications include, for example, introduction of a substituent by means of an aromatic substitution reaction, reduction of substituents, alkylation of substituents and oxidation of substituents. The reagents and reaction conditions for such procedures are well known in the chemical arts. Particular examples of aromatic substitution reactions include the introduction of a nitro group using concentrated nitric acid, the introduction of an acyl group using, for example, an acyl halide and Lewis acid (such as aluminum trichloride) under Friedel Crafts conditions; the introduction of an alkyl group using an alkyl halide and Lewis acid (such as aluminum trichloride) under Friedel Crafts conditions; and the introduction of a halogeno group. Particular examples of modifications include the reduction of a nitro group to an amino group by, for example, catalytic hydrogenation with a nickel catalyst or treatment with iron in the presence of hydrochloric acid with heating; oxidation of alkylthio to alkylsulphinyl or alkylsulphonyl.

The fluorescent conjugates of the present disclosure comprising compounds of formula I can be synthesized using any conventional methods known in the art.

Composition

In still another aspect, the present disclosure further provides a composition comprising the compound of above-mentioned formula I or conjugates thereof, which is used for staining biological samples.

The composition disclosed may comprise, besides compounds of formula I or conjugates thereof, other components required for staining biological samples, e.g., solvents, osmotic regulating agents, pH regulating agents, surfactants, etc. The composition of the present disclosure may exist in the form of aqueous solution, or in other suitable forms that can be formulated into solution using water prior to usage.

Usage

In still another aspect, the present disclosure further provides a method for staining biological samples using the compounds of the above-mentioned formula I or conjugates thereof, or a composition comprising the compounds of the above-mentioned formula I or conjugates thereof. The method may include the step of contacting the compounds of the above-mentioned formula I or conjugates thereof, or the composition comprising compounds of the above-mentioned formula I or conjugates thereof with the biological samples. The term "contacting" as used herein may include contacting in solution or in solid phase.

Characteristics

From the above description and common knowledge familiar to those skilled in the art, the fluorescent dyes disclosed may optionally include one of the following characteristics:

(1) introduction of sterically bulky benzyl into the molecules of the disclosed fluorescent dyes increases the light stability of the dyes, countering the decrease in the light stability of the dyes due to extension of the methine chain.

(2) compared to the benzothiazole- and indoline-based symmetric cyanine dyes having the same methine chain, the fluorescent dyes disclosed herein, introduce a quinoline ring on one end of the molecule, and increase the maximum absorption wavelength by about 80 nm, have a wider emission wavelength scope that reaches the near-infrared region of 650 nm-900 nm, can avoid interference from the fluorescent background of the biological samples per se, and have a larger molar extinction coefficient and a higher sensitivity, leading to their application in various biological detection fields such as nucleic acid labeling, immunological detection and blood cell analysis;

(3) the fluorescent dyes disclosed may exhibit a shorter methine chain and are therefore simple in structure, readily available in raw materials, low in toxic and side effects, and cheaper than other alternatives, and can be readily applied in various industries;

(4) the fluorescent dyes disclosed may be used with a red semiconductor laser, which is inexpensive, small, and stable, as the light source, which greatly reduces the cost of the accompanying equipment.

To illustrate the optimization and improvement made by the disclosed compounds on dye performance, Examples 6 and 7 use the known Compound M as a reference which has the following structure:

Compound M can be synthesized via the following synthesis route or with reference to Journal of the American Chemical Society (1945) 67, 1889-93.

(I)

The following specific examples are included for illustrative purposes only and are not to be considered as limiting to this disclosure. The reagents and intermediates used in the following examples are either commercially available or can be prepared according to standard literature procedures by those skilled in the art of organic synthesis.

EXAMPLE 1

Synthesis of the intermediate 1-benzyl-2-methylbenzothiazole quaternary ammonium salt. 20 mmol of 2-methylbenzothiazole and 22 mmol of benzyl bromide are added under argon protection into a 50 ml round-bottom flask containing 20 ml toluene, and the reaction mixture is stirred and heated to reflux for 24 hours. After the mixture cools down, the precipitate is filtered and the filter cake is washed with ethyl ether and dried to yield a pale-pink solid powder in a crude yield of 58%.

EXAMPLE 2

Preparation of Compound A 10 mmol of 1-benzyl-2-methylbenzothiazole quaternary ammonium salt and 30 mmol of N,N'-diphenylformamidine in 60 ml of acetic acid are heated while stirring in a 90° C. oil bath for 1.5 hours. The resulting red oily mass is washed with petroleum ether in suspension 3 times to remove acetic acid. Then ethyl ether is added to precipitate an orange solid powder which is then filtered and dried. This crude product is separated on a silica column using dichloromethane:methanol=100:3 as the eluent. The yellow fraction is collected with a yield of 42%, into which 4 mmol of 1-benzyl-4-quinoline quaternary ammonium salt and 10 ml of pyridine are added, and the mixture is heated while stirring in a 90° C. oil bath for 1.5 hours. The reaction liquid is then poured into ethyl ether to precipitate small, dark purple dye particles which are later filtered and dried. The dye is purified on a silica column using dichloromethane:methanol=100:5 as the eluent, and the blue fraction is collected to obtain the title compound in a yield of 70%.

$^1$H-NMR δ (400 MHz, CD$_3$OD, TMS) 5.49 (s, 2H), 5.71 (s, 2H), 6.44 (d, 1H), 6.98 (d, 1H), 7.18-7.80 (m, 18H), 8.23 (t, 1H), 8.31 (d, 1H), 8.36 (d, 1H). MS (EI) C$_{33}$H$_{27}$BrN$_2$S m/z: 483.2 [M-Br]$^+$.

EXAMPLE 3

Preparation of Compound B 10 mmol of 1-(4-fluoro)-benzyl-2-methylbenzothiazole quaternary ammonium salt and 30 mmol of N,N'-diphenyl-formamidine in 60 ml of acetic acid are heated while stirring in a 90° C. oil bath for 1.5 hours. The resulting red oily mass is washed with petroleum ether in suspension 3 times to remove acetic acid. Then an amount of ethyl ether is added to precipitate an orange solid powder which is then filtered and dried. This crude product is separated on a silica column using dichloromethane: methanol=100:3 as the eluent. The yellow fraction is collected, with a yield of 47%, into which 5 mmol of 1-(4-fluoro)-benzyl-4-methylquinoline quaternary ammonium salt and 10 ml of pyridine are added, and the mixture is heated while stirring in a 90° C. oil bath for 1.5 hours. The reaction liquid is then poured into ethyl ether to precipitate small, dark purple dye particles which are later filtered and dried. The dye is purified on a silica column using dichloromethane:methanol=100:5 as the eluent, and the blue fraction is collected to obtain the title compound in a yield of 65%.

$^1$H-NMR δ (400 MHz, CD$_3$OD, TMS) 5.46 (s, 2H), 5.68 (s, 2H), 6.45 (d, 1H), 6.97 (d, 1H), 7.05-7.76 (m, 16H), 8.18 (t, 1H), 8.30 (d, 1H), 8.37 (d, 1H). MS (EI) C$_{33}$H$_{25}$BrF$_2$N$_2$S m/z: 519.2 [M-Br]$^+$.

EXAMPLE 4

Preparation of Compound C

10 mmol of 1-(4-methoxy)-benzyl-2-methylbenzothiazole quaternary ammonium salt and 14 mmol of N,N'-diphenyl-formamidine in 40 ml of acetic acid are heated while stirring in a 90° C. oil bath for 2 hours. The resulting red oily mass is washed with petroleum ether in suspension 3 times to remove acetic acid. Then an amount of ethyl ether is added to precipitate an orange solid powder which is then filtered and dried. This crude product is separated on a silica column using dichloromethane:methanol=100:3.5 as the eluent. The yellow fraction is collected, with a yield of 35%, into which 3 mmol of 1-ethyl-4-methylquinoline quaternary ammonium salt and 8 ml of pyridine are added, and the mixture is heated while stirring in a 90° C. oil bath for 1 hour. The reaction liquid is then poured into ethyl ether to precipitate small dark purple dye particles which are later filtered and dried. The dye is purified on a silica column using dichloromethane:methanol=100:6 as the eluent, and the blue fraction is collected in a yield of 75%.

$^1$H-NMR δ (400 MHz, CD$_3$OD, TMS) 1.23 (t, 3H), 3.76 (tetra, 2H), 3.69 (s, 3H), 5.69 (s, 2H), 6.44 (d, 1H), 6.98 (d, 1H), 7.18-7.90 (m, 12H), 8.23 (t, 1H), 8.31 (d, 1H), 8.36 (d, 1H). MS (EI) $C_{29}H_{27}IN_2OS$ m/z: 451.2 $[M-I]^+$.

EXAMPLE 5

Preparation of Compound D 10 mmol of 1-(4-carboxy)-benzyl-2,3,3-trimethylbenzo-3H-indoline quaternary ammonium salt and 15 mmol of N,N'-diphenylformamidine in 40 ml of acetic acid are heated while stirring in a 90° C. oil bath for 1.5 hours. The resulting red oily mass is washed with petroleum ether in suspension 3 times to remove acetic acid. Then an amount of ethyl ether is added to precipitate an orange solid powder which is then filtered and dried. This crude product is separated on a silica column using dichloromethane:methanol=100:4 as the eluent. The yellow fraction is collected, with a yield of 37%, into which 4 mmol of 1,4-dimethylquinoline quaternary ammonium salt and 8 ml of acetate anhydride are added, and the mixture is heated while stirring in a 90° C. oil bath for 2 hours. The reaction liquid is then poured into ethyl ether to precipitate small dark purple dye particles that are later filtered and dried. The dye is purified on a silica column using dichloromethane:methanol=100:20 as the eluent, and the blue fraction is collected in a yield of 68%.

$^1$H-NMR δ (400 MHz, $CD_3OD$, TMS) 1.73 (s, 6H), 3.80 (s, 3H), 5.49 (s, 2H) 6.44 (d, 1H), 6.96 (d, 1H) 7.21-7.80 (m, 12H), 8.22 (t, 1H), 8.32 (d, 1H), 8.36 (d, 1H). MS (EI) $C_{31}H_{29}IN_2O_2$ m/z: 461.2 $[M-I]^+$.

EXAMPLE 6

Preparation of Compound E 8 mmol of 1-benzyl-2-methylbenzothiazole quaternary ammonium salt and 10 mmol of N,N'-diphenyl-1,3-propanediimine hydrochloric acid in 20 ml of solvent (acetic acid: acetate anhydride=1:1) are heated to 120° C. and reacted for 1 hour. The reaction mixture is cooled and ethyl acetate is added to precipitate solids. The solids are filtered and washed with ethyl acetate 3 times to remove the excess unreacted condensing agent. After drying, brown yellow powder is obtained in a crude yield of 79%, into which 6 mmol of 1-(4-nitro)-benzyl-4-methylquinoline quaternary ammonium salt and 10 ml of acetate anhydride are added, and the mixture is heated while stirring in a 120° C. oil bath for 1.5 hours. The reaction liquid is then poured into ethyl ether to precipitate small dark purple dye particles that are later filtered and dried. The dye is purified on a silica column using dichloromethane:methanol=100:10 as the eluent, and the blue fraction is collected in a yield of 43%.

$^1$H-NMR δ (400 MHz, $CD_3OD$, TMS) 5.49 (s, 2H), 5.72 (s, 2H), 6.24 (d, 1H), 6.37 (d, 1H), 6.48 (t, 2H), 8.29 (t, 1H), 7.22-7.85 (m, 17H), 8.38 (d, 1H), 8.45 (d, 1H). MS (EI) $C_{35}H_{28}BrN_3O_2S$: m/z: 554.2 $[M-Br]^+$.

EXAMPLE 7

Figure 1:
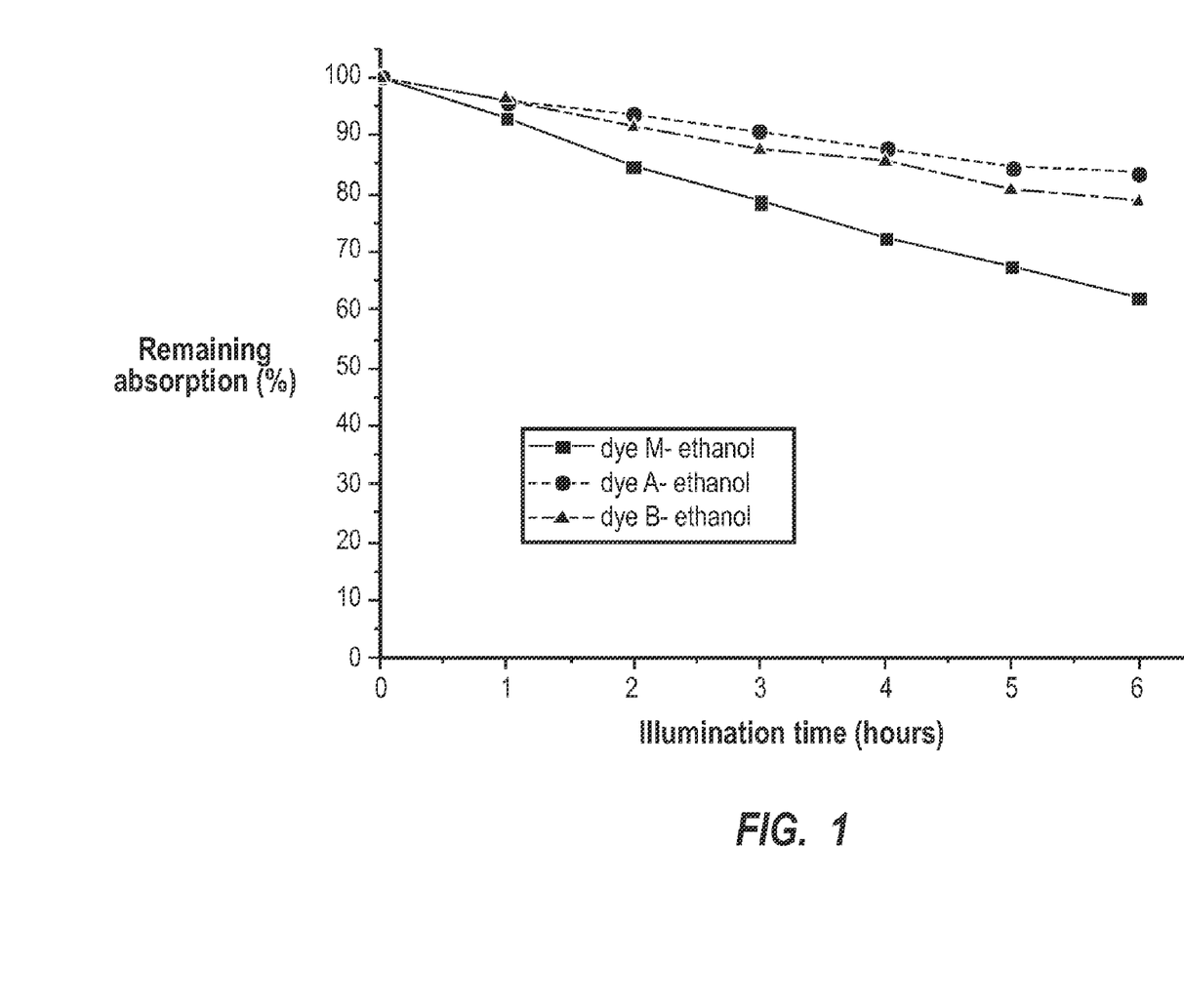
FIG. 1 compares the light stability of Compounds A and B in ethanol with that of a known Compound M. The abscissa is time (hours) and the ordinate is the percentage of the remaining absorbance. The light source is a 500 W iodine-tungsten lamp, and the equipment used is a UV-Vis spectrophotometer (Model Lambda 35).
Figure 2:
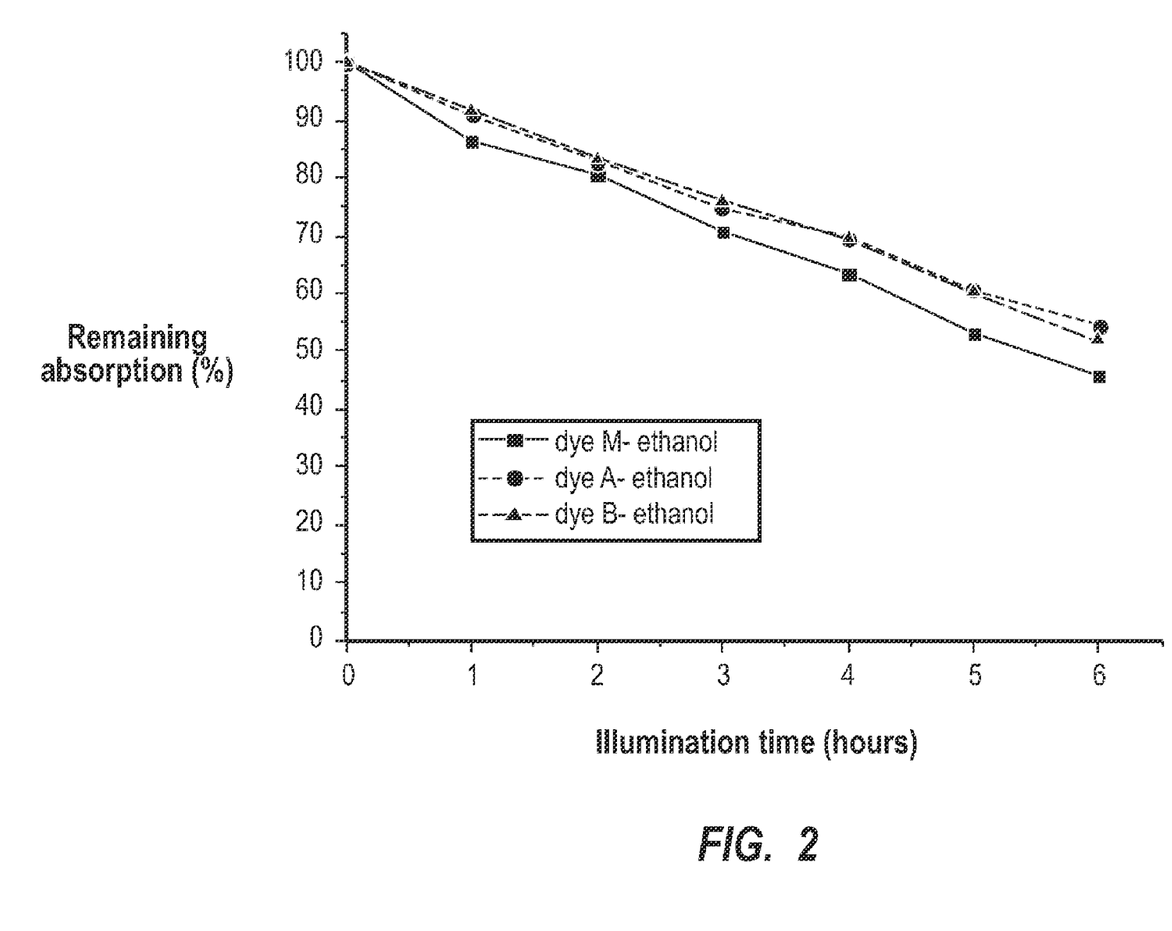
FIG. 2 compares the light stability of Compounds A and B in DMSO with that of known Compound M. The abscissa is time (hours) and the ordinate is the percentage of the remaining absorbance. The light source used is a 500 W iodine-tungsten lamp, and the equipment used is a UV-Vis spectrophotometer (Model Lambda 35).

Determination of the light stability of Compounds A, B and M in ethanol and DMSO: The Compounds A, B and M are respectively formulated into $1\times10^{-5}$M solution in ethanol or DMSO and placed into sealable cuvettes. A 50 g/L sodium nitrite solution is placed in a cuboid glass jar to act as a cut-off filter that filters UV light with a wavelength under 400 nm. In addition, the sodium nitrite solution can also function as a cold trap to keep the temperature of the sample at an even temperature. After measuring the initial absorbance of the sample, the 500 W iodine-tungsten lamp used as the light source is turned on to irradiate the sample 20 cm away, and timing starts. The absorbances of the sample after being irradiated are measured every hour. As shown in FIGS. 1 and 2, after 6-hour irradiation, the known Compound M fades by 38% and 54% in ethanol and DMSO respectively, Compound A fades by 16% and 45% respectively, and Compound B fades by 21% and 48% respectively. The equipment used is a UV-Vis Spectrophotometer (Model Lambda 35).

Data indicates that the compounds of the present disclosure exhibit an obviously higher light stability than the known Compound.

EXAMPLE 8

Figure 3:
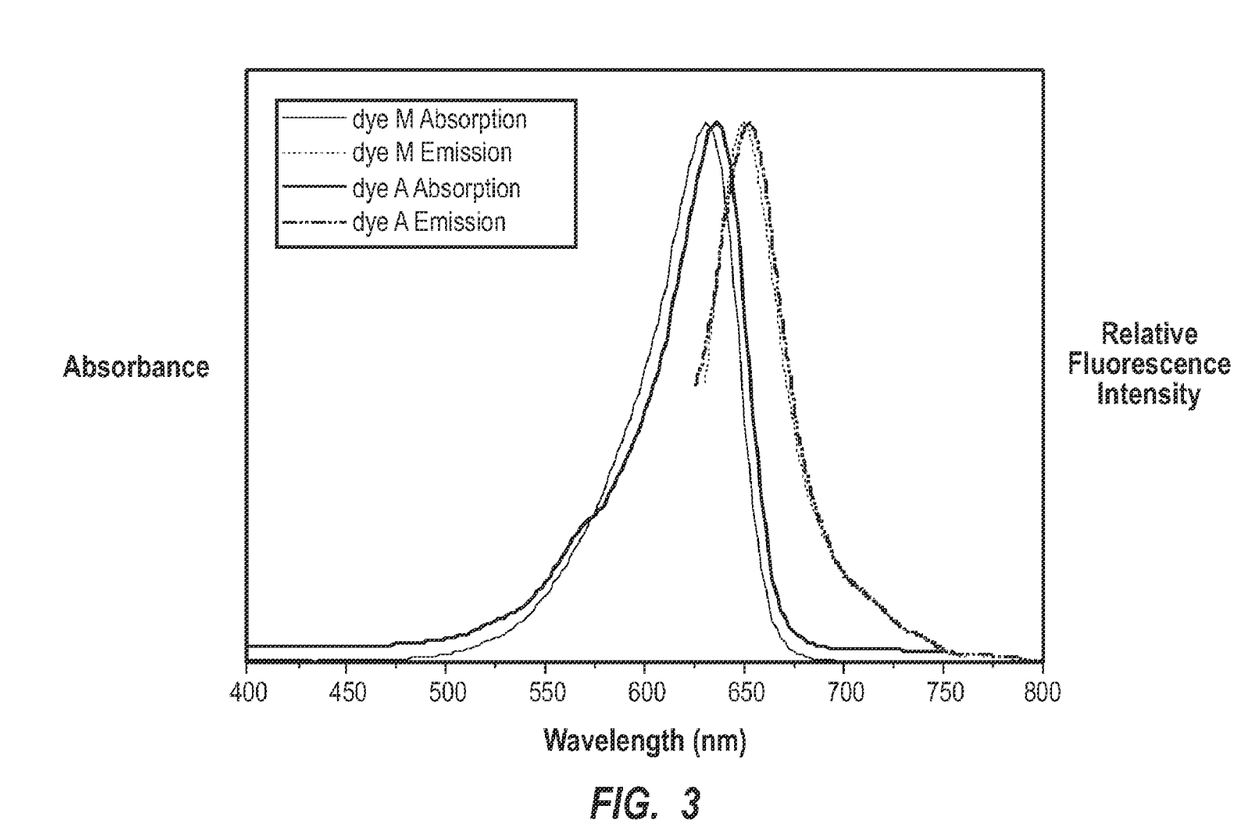
FIG. 3 is the absorption and emission spectra of Compound A and the known Compound M in ethanol solution. The abscissa is wavelength (nm) and the ordinate is the normalized values of absorbance and fluorescence intensity. The equipment used is a UV-Vis spectrophotometer (Model Lambda 35) and a spectrofluorophotometer (Model LS 55).
Figure 4:
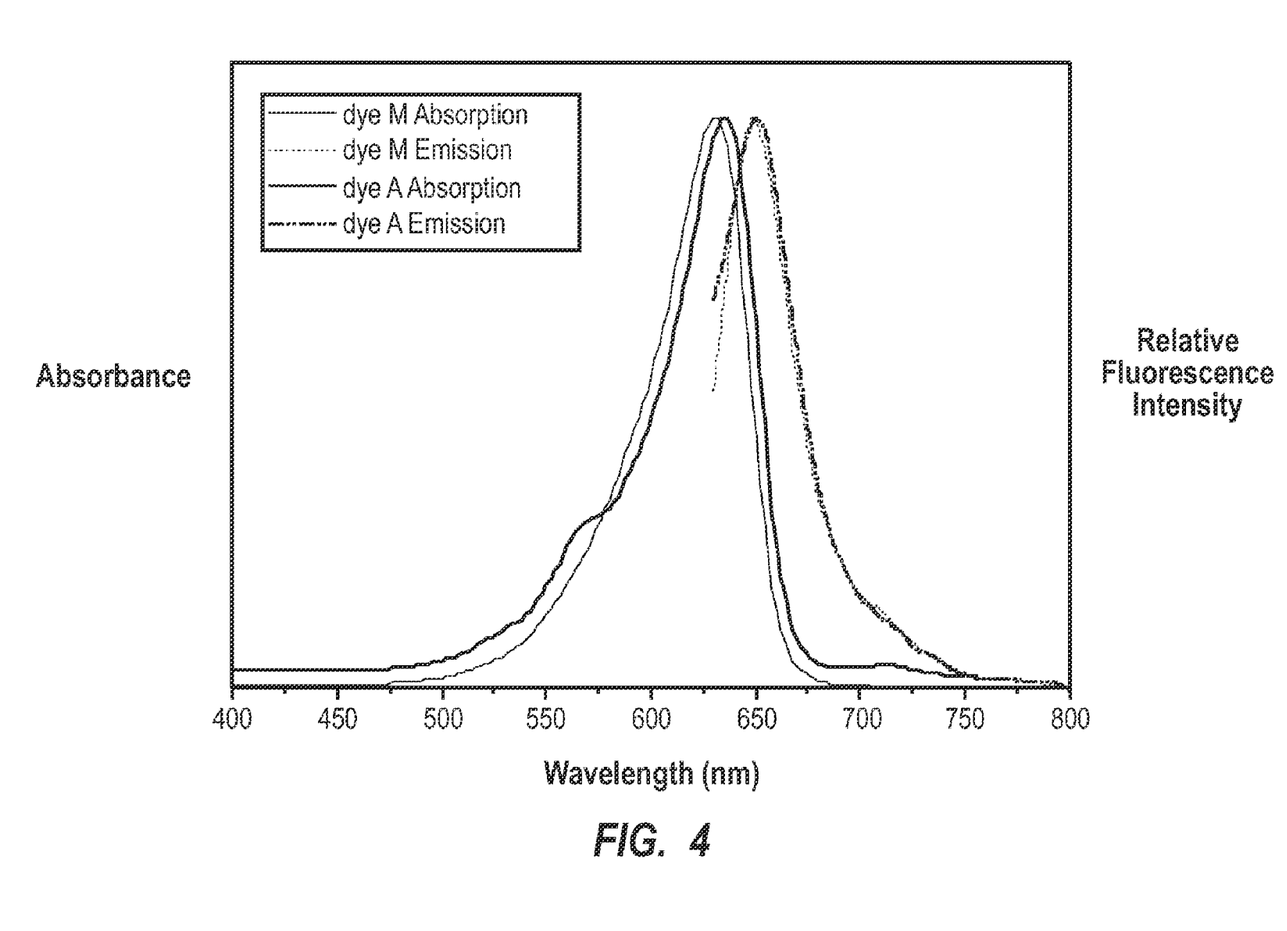
FIG. 4 is the absorption and emission spectra of Compound B and the known Compound M in ethanol solution. The abscissa is wavelength (nm) and the ordinate is the normalized values of absorbance and fluorescence intensity. The equipment used is a UV-Vis spectrophotometer (Model Lambda 35) and a spectrofluorophotometer (Model LS 55).

Determination of the fluorescence quantum yield of Compounds A, B and M in ethanol: Solutions of Compounds A, B or M in ethanol, in certain concentrations, have a maximum absorbance of less than 0.1 as determined by a UV-Vis Spectrophotometer. Fluorescence intensities are measured at selected excitation wavelengths. For each compound, the determination is made in triplicate, the fluorescence quantum yield of each determination is calculated, and the mean value is taken. Using Rhodamine B as the standard ($\phi_F$=0.97, ethanol), the calculated fluorescence quantum yield in ethanol solution is ($\phi_F$=0.44×$10^{-2}$ for the known Compound M, $\phi_F$=0.76×$10^{-2}$ for Compound A and $\phi_F$=0.55×$10^{-2}$ for Compound B. FIGS. 3 and 4 are, respectively, the absorption and emission spectra of Compounds A and M, and Compounds B and M in ethanol. The equipment used is a UV-Vis spectrophotometer (Model Lambda 35) and a spectrofluorophotometer (Model LS 55).

Data indicates that the compounds of the present disclosure exhibit a higher fluorescence quantum yield than the known Compound.

EXAMPLE 9

Figure 5:
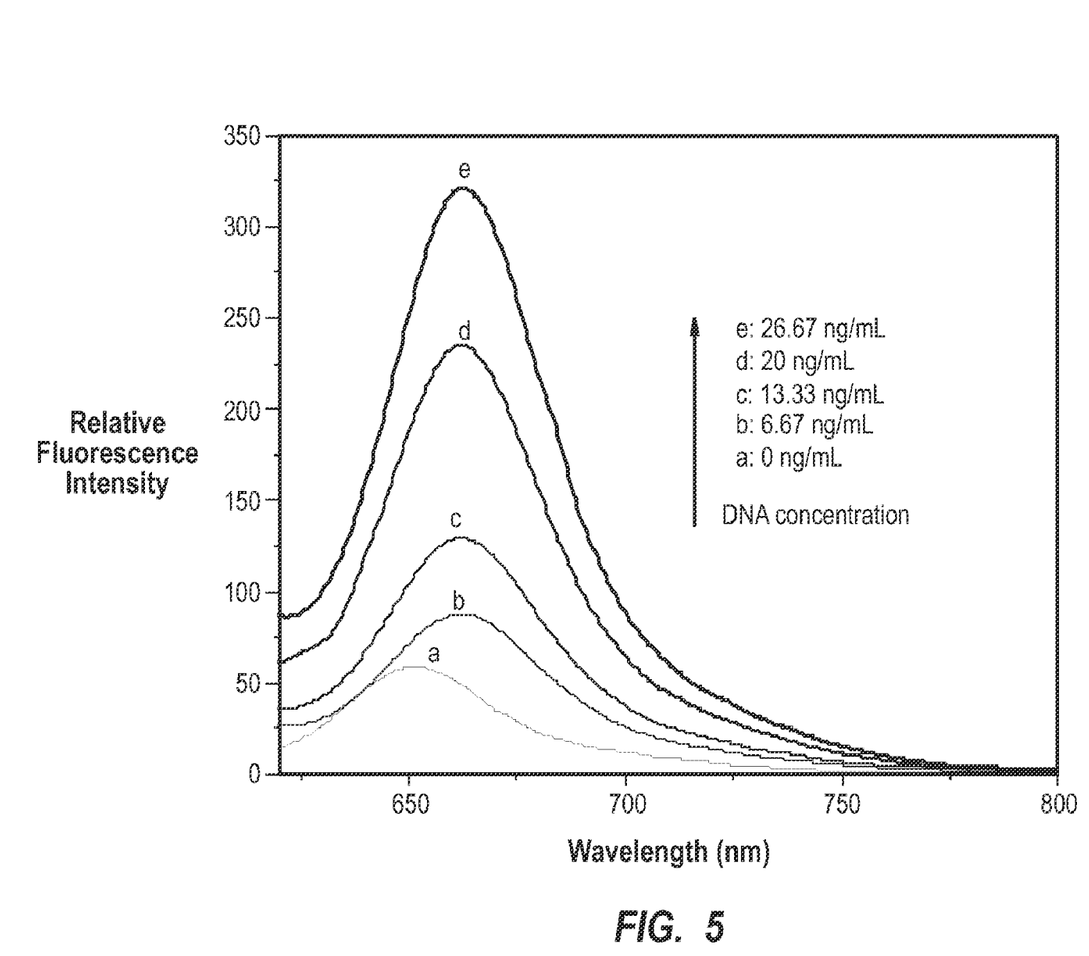
FIG. 5 is the fluorescent emission spectrum of Compound A in aqueous solutions containing pET-32a (+) plasmid DNA at different concentrations. The abscissa is wavelength (nm) and the ordinate is fluorescence intensity. The arrow indicates the concentrations of DNA (ng/mL) change in an ascending sequence from 0, 6.67, 13.33, 20 to 26.67 ng/mL. The equipment used is a spectrofluorophotometer (Model LS 55).

Determination of the fluorescence intensity of Compound A in aqueous solutions containing different concentrations of DNA: A solution of Compound A in DMSO in a concentration of $1\times10^{-4}$ M is formulated. 100 µL of the solution is diluted with deionized water to 3 mL, and the dilution is placed in a cuvette to determine its fluorescence intensity. Then, 2 µL of pET-32a (+) plasmid DNA in a concentration of 10 ng/µL is dropped into the cuvette and its fluorescence intensity is determined after stabilization. The DNA is dropped continuously and the fluorescence intensity is determined accordingly. As shown in FIG. 5, as the concentration of DNA increases, the fluorescence intensity gradually increases. Also, the emission spectrum of the dye is red shifted by about 10 nm compared to before the addition of the DNA. The determination temperature is 0-5° C. and the equipment used is a spectrofluorophotometer (Model LS 55). It can be seen from FIG. 5 that the fluorescence intensity generated by the fluorescent dye of the present invention depends on the concentration of the DNA, and therefore the fluorescent dye of the present invention can be used in the staining of intracellular nucleic acids.

It will be obvious to those having skill in the art that many changes may be made to the details of the above-described embodiments without departing from the underlying principles of the invention. The scope of the present invention should, therefore, be determined only by the following claims.

What is claimed is:

1. A fluorescent dye comprising a compound having the following general structural formula I:

Formula I wherein n is 1, 2 or 3;

X is chosen from: $C(CH_3)_2$, O, S or Se;

$R_1$ and $R_2$ are each independently chosen from H, $C_{1-18}$alkyl, —$C_{1-6}$alkyl-$OR_5$ or halogen;

$R_3$ is independently chosen from: H, $C_{1-18}$alkyl, $OR_5$, —$C_{1-6}$alkyl-$OR_5$, $COOR_5$, $NO_2$, CN or halogen;

$R_4$ is $C_{1-18}$alkyl, —$C_{1-6}$alkyl-$OR_5$, benzyl or halogen, said benzyl optionally substituted with one or more substituents independently chosen from: halogen, hydroxyl, sulfhydryl, cyano, nitro, alkyl, aryl, alkoxy, heterocyclyl, haloalkyl, amino, alkylamino, amido, or carboxyl;

$R_5$ is H or $C_{1-18}$alkyl; and $Y^-$ is a counter ion;

or derivatives and conjugates thereof.

2. The fluorescent dye according to claim 1, wherein $R_1$ and $R_2$ are each independently selected from H, $C_{1-18}$alkyl or halogen.

3. The fluorescent dye according to claim 1, wherein $R_1$ and $R_2$ are both H.

4. The fluorescent dye according to claim 1, wherein $R_3$ is independently chosen from: H, $C_{1-18}$alkyl, $OR_5$, $COOR_5$ or halogen.

5. The fluorescent dye according to claim 1, wherein $R_3$ is independently chosen from: H, $C_{1-6}$alkyl, $OR_5$, $COOR_5$ or halogen.

6. The fluorescent dye according to claim 1, wherein $R_4$ is $C_{1-18}$alkyl, benzyl or halogen, said benzyl optionally substituted with one or more substituents selected from the group consisting of halogen, hydroxyl, sulfhydryl, cyano, nitro, alkyl, aryl, alkoxy, heterocyclyl, haloalkyl, amino, alkylamino, amido, or carboxyl.

7. The fluorescent dye according to claim 1, wherein $R_4$ is $C_{1-6}$alkyl or benzyl, said benzyl is optionally substituted with halogen, hydroxyl, sulfhydryl, cyano, nitro or amino.

8. The fluorescent dye according to claim 1, wherein $R_5$ is H or $C_{1-12}$alkyl.

9. The fluorescent dye according to claim 1, wherein $R_5$ is H or $C_{1-6}$alkyl.

10. The fluorescent dye according to claim 1, wherein X is $C(CH_3)_2$, O or S.

11. The fluorescent dye according to claim 1, wherein X is $C(CH_3)_2$ or S.

12. The fluorescent dye according to claim 1, wherein n is 1 or 2.

13. The fluorescent dye according to claim 1, wherein $Y^-$ is chosen from:

halogen ions, $ClO_4^-$, $PF_6^-$, $CF_3SO_3^-$, $BF_4^-$, acetate or p-toluenesulfonate anions.

14. The fluorescent dye according to claim 1, wherein said compound is chosen from:

or derivatives and conjugates thereof.

15. A method for synthesizing the compound of formula I according to claim 1, the method comprising:

i) reacting unsubstituted or substituted 2-methylbenzothiazole, unsubstituted or substituted 2-methylbenzooxazole or unsubstituted or substituted 2,3,3-trimethyl-3H-indoline with substituted or unsubstituted benzylhalide to obtain a quaternary ammonium salt intermediate according to formula II:

ii) condensing the resulting quaternary ammonium salt intermediate of formula II with N,N'-diphenylformamidine or higher homologues thereof to obtain a compound of formula III:

Formula III iii) obtaining substituted or unsubstituted 4-methylquinoline quaternary ammonium salt intermediates; and iv) refluxing the 4-methylquinoline quaternary ammonium salt intermediate obtained in iii) with compounds of formula III to afford compounds of formula I;

wherein X, n, $R_1$, $R_2$, $R_3$, $R_4$, $R_5$ and $Y^-$ are as defined in claim 1.

16. A composition used in staining biological samples, wherein said composition comprises the compound of formula I, according to claim 1.

17. The composition according to claim 16, wherein said compound is chosen from:

-continued or derivatives and conjugates thereof.

18. A method for staining biological samples, the method comprising contacting the compound of formula 1, according to claim 1, with biological samples.

19. The method according to claim 18, wherein said compound is chosen from:

-continued or derivatives and conjugates thereof.

* * * * *